(12) United States Patent
Kim et al.

(10) Patent No.: US 9,370,001 B2
(45) Date of Patent: Jun. 14, 2016

(54) METHOD AND WIRELESS DEVICE FOR TRANSMITTING DATA PACKET

(71) Applicant: LG ELECTRONICS INC., Seoul (KR)

(72) Inventors: Hakseong Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/385,900

(22) PCT Filed: Mar. 18, 2013

(86) PCT No.: PCT/KR2013/002189
§ 371 (c)(1),
(2) Date: Sep. 17, 2014

(87) PCT Pub. No.: WO2013/141546
PCT Pub. Date: Sep. 26, 2013

(65) Prior Publication Data
US 2015/0078275 A1    Mar. 19, 2015

Related U.S. Application Data

(60) Provisional application No. 61/612,391, filed on Mar. 18, 2012, provisional application No. 61/614,484, filed on Mar. 22, 2012.

(51) Int. Cl.
*H04W 72/04* (2009.01)
*H04W 72/12* (2009.01)

(52) U.S. Cl.
CPC ........ *H04W 72/042* (2013.01); *H04W 72/1289* (2013.01)

(58) Field of Classification Search
CPC . H04W 72/04; H04W 72/042; H04W 72/087; H04W 72/085; H04W 76/023; H04W 28/16; H04W 16/14; H04W 84/045; H04W 76/02; H04W 72/1289
USPC .......................................................... 370/329
See application file for complete search history.

(56) References Cited

U.S. PATENT DOCUMENTS

| 9,084,222 B2 * | 7/2015 | Chai et al. | |
| 2008/0069033 A1 * | 3/2008 | Li et al. | 370/328 |
| 2010/0169498 A1 * | 7/2010 | Palanki et al. | 709/228 |

(Continued)

FOREIGN PATENT DOCUMENTS

| JP | 2009-523392 A | 6/2009 |
| KR | 10-0934264 B1 | 12/2009 |

(Continued)

*Primary Examiner* — Curtis A Alia
*Assistant Examiner* — Vanneilian Lalchinthang
(74) *Attorney, Agent, or Firm* — Birch, Stewart, Kolasch & Birch, LLP

(57) ABSTRACT

Provided are a method and a wireless device for transmitting a data packet in a wireless communication system. The wireless device engages in peer discovery with a receiver and monitors whether transmission (TX) scheduling information from a base station is received. A data packet is transmitted to the receiver on the basis of the TX scheduling information. The TX scheduling information comprises resource allocation information indicating resource allocation for transmitting the data packet, identification information indicating an identifier for the receiver; and information indicating whether the TX scheduling information is for TX scheduling or reception (RX) scheduling.

9 Claims, 6 Drawing Sheets

(56) References Cited

U.S. PATENT DOCUMENTS

| | | | |
|---|---|---|---|
| 2010/0189048 A1* | 7/2010 | Baker et al. | 370/329 |
| 2011/0312331 A1* | 12/2011 | Hakola et al. | 455/452.2 |
| 2013/0343283 A1* | 12/2013 | Laroia et al. | 370/328 |
| 2014/0018010 A1* | 1/2014 | Gao et al. | 455/67.13 |

FOREIGN PATENT DOCUMENTS

| | | |
|---|---|---|
| KR | 10-2011-0067146 A | 6/2011 |
| WO | WO 2009/014278 A1 | 1/2009 |

* cited by examiner

METHOD AND WIRELESS DEVICE FOR TRANSMITTING DATA PACKET

CROSS REFERENCE TO RELATED APPLICATIONS

This application is the National Phase of PCT International Application No. PCT/KR2013/002189, filed on Mar. 18, 2013, which claims priority under 35 U.S.C. 119(e) to U.S. Provisional Application Nos. 61/612,391, filed on Mar. 18, 2012 and 61/614,484, filed on Mar. 22, 2012, all of which are hereby expressly incorporated by reference into the present application.

BACKGROUND OF THE INVENTION

1. Field of the Invention

The present invention relates to wireless communications, and more particularly, to a method for transmitting a data packet in a wireless communication system, and a wireless device using the method.

2. Related Art $3^{rd}$ generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

Device-to-device (D2D) communication is a distributed communication technique in which adjacent wireless nodes directly deliver traffic. In the D2D communication, a wireless node such as a mobile phone autonomously discovers another wireless node which is physically adjacent, establishes a communication session, and thereafter transmits traffic.

The D2D technique such as Bluetooth or WiFi Direct directly supports communication between wireless nodes without a support of a base station. D2D communication managed by the base station is also introduced. In this case, scheduling for the D2D communication is managed by the base station. In doing so, a traffic overload problem can be decreased by dispersing traffic concentrated to the base station.

It is proposed a method of exchanging scheduling information for the D2D communication between the wireless device and the base station.

SUMMARY OF THE INVENTION

The present invention provides a method of transmitting a data packet in a wireless communication system, and a wireless device using the method.

In an aspect, a method of transmitting a data packet in a wireless communication system is provided. The method includes performing, by a transmitter, a peer discovery with a receiver, monitoring, by the transmitter, whether transmission (TX) scheduling information is received from a base station, and transmitting, by the transmitter, the data packet to the receiver based on the TX scheduling information. The TX scheduling information includes resource allocation information indicating a resource allocation for transmission of the data packet, identification information indicating an identifier of the receiver, and information indicating whether the TX scheduling information is for TX scheduling or receive (RX) scheduling.

The monitoring of the TX scheduling information may include decoding a physical downlink control channel (PDCCH) candidate in a search space of a subframe, and if the decoding is successful, receiving the TX scheduling information in a corresponding PDCCH.

The decoding of the PDCCH candidate may be performed based on an identifier for device-to-device (D2D) communication.

In another aspect, a wireless device for transmitting a data packet in a wireless communication system is provided. The wireless device includes a radio frequency (RF) unit configured to transmit and receive a radio signal, and a processor operatively coupled to the RF unit and configured to perform a peer discovery with a receiver via the RF unit, monitor whether transmission (TX) scheduling information is received from a base station, and transmit the data packet to the receiver based on the TX scheduling information via the RF unit, By utilizing the existing $3^{rd}$ generation partnership project (3GPP) long term evolution-advanced (LTE) structure, scheduling for communication between wireless devices is possible.

DESCRIPTION OF EXEMPLARY EMBODIMENTS

A wireless device may be fixed or mobile, and may be referred to as another terminology, such as a user equipment (UE), a mobile station (MS), a user terminal (UT), a subscriber station (SS), a mobile terminal (MT), etc. A base station (BS) is generally a fixed station that communicates with the wireless device and may be referred to as another terminology, such as an evolved node-B (eNB), a base transceiver system (BTS), an access point, etc.

Hereinafter, the present invention is applied based on a $3^{rd}$ generation partnership project (3GPP) long term evolution (LTE) or a 3GPP LTE-Advanced (LTE-A). This is for exemplary purposes only, and thus the present invention is applicable to various communication systems. In the following description, LTE and/or LTE-A are collectively referred to as LTE.

The LTE system is not allowed for direct communication between wireless devices, and is scheduled by the BS. In order to disperse increasing data traffic, it is considered to support device-to-device (D2D) communication between the wireless devices without the BS or with the BS performing scheduling to a minimum extent.

Figure 1:
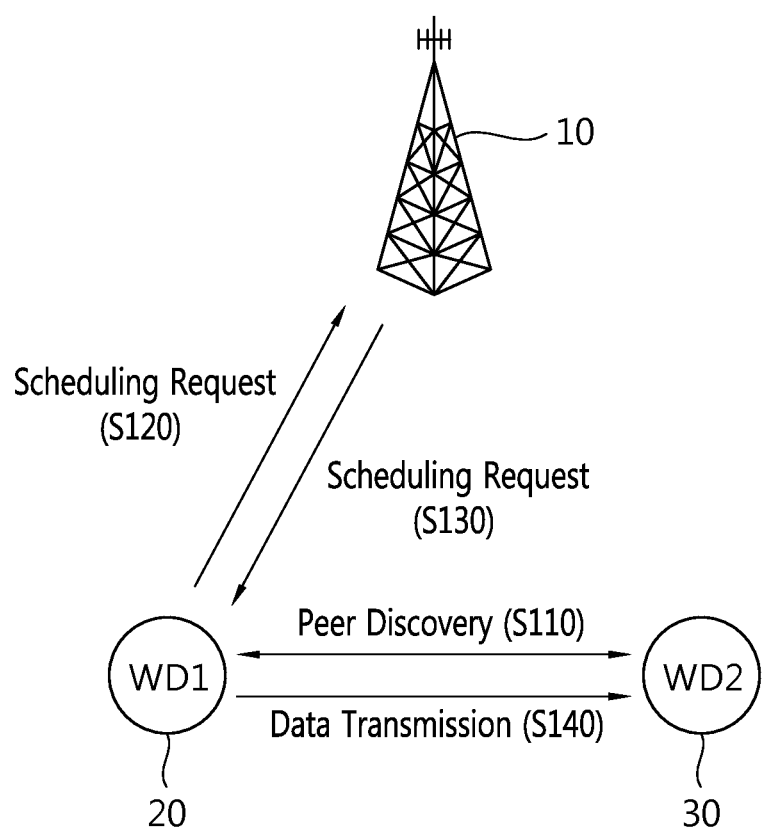
FIG. 1 shows an example of device-to-device (D2D) communication managed by a base station.

FIG. 1 shows an example of D2D communication managed by a BS.

Each of a wireless device (WD)1 20 and a WD2 30 establishes a connection (e.g., a radio resource control (RRC) connection) with a BS 10.

The WD1 20 and the WD2 30 are located within a distance allowing communication with each other, and perform peer discovery to identify each other (step S110). For the peer discovery, the WD1 20 and the WD2 30 may broadcast an identification message including identification information thereof and/or a synchronization signal. The WD1 20 and the WD2 30 may periodically discover an identification message of a peer device, or may discover it at a request of the BS.

Although only two wireless devices 20 and 30 are considered herein, this is for exemplary purposes only. For clarity, it is described for example that the WD1 20 transmits data to the WD2 30.

The WD1 20 sends to the BS 10 a scheduling request for transmission to the WD2 30 (step S120). The scheduling request may include information regarding a channel state (e.g., a channel quality indicator (CQI), a timing difference, etc.) between the WD1 20 and the WD2 30.

The BS 10 sends to the WD1 20 a resource allocation (step S130). The WD1 20 transmits to the WD2 30 a data packet on the basis of the resource allocation (step S140).

Now, a downlink (DL) channel structure based on 3GPP LTE is described.

Figure 2:
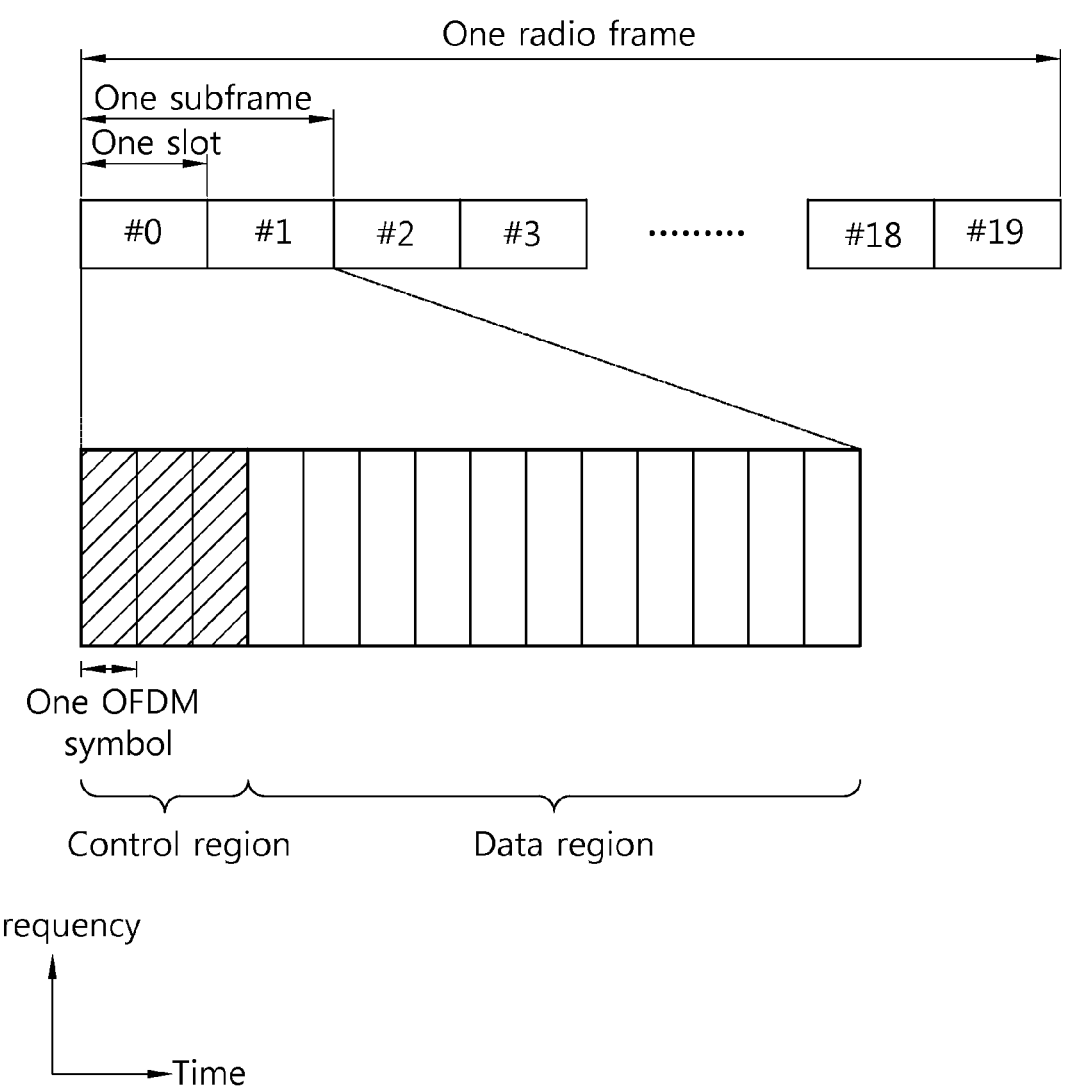
FIG. 2 shows a structure of a DL radio frame in 3GPP LTE-A.

FIG. 2 shows a structure of a DL radio frame in 3GPP LTE-A. The section 6 of 3GPP TS 36.211 V10.2.0 (2011-06) "Evolved Universal Terrestrial Radio Access (E-UTRA);

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in multiple access schemes or terminologies. For example, the OFDM symbol may also be referred to as another terminology such as a single carrier frequency division multiple access (SC-FDMA) symbol, a symbol period, etc.

Although it is described that one slot includes 7 OFDM symbols for example, the number of OFDM symbols included in one slot may vary depending on a length of a cyclic prefix (CP). According to 3GPP TS 36.211 V10.2.0, in case of a normal CP, one slot includes 7 OFDM symbols, and in case of an extended CP, one slot includes 6 OFDM symbols.

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7×12 resource elements (REs).

A DL subframe is divided into a control region and a data region in the time domain. The control region includes up to first four OFDM symbols of a first slot in the subframe. However, the number of OFDM symbols included in the control region may vary. A physical downlink control channel (PDCCH) and other control channels are allocated to the control region, and a physical downlink shared channel (PD-SCH) is allocated to the data region.

As disclosed in 3GPP TS 36.211 V10.2.0, examples of a physical control channel in 3GPP LTE/LTE-A include a physical downlink control channel (PDCCH), a physical control format indicator channel (PCFICH), and a physical hybrid-ARQ indicator channel (PHICH).

The PCFICH transmitted in a first OFDM symbol of the subframe carries a control format indicator (CFI) regarding the number of OFDM symbols (i.e., a size of the control region) used for transmission of control channels in the subframe. A wireless device first receives the CFI on the PCFICH, and thereafter monitors the PDCCH.

Unlike the PDCCH, the PCFICH does not use blind decoding, and is transmitted by using a fixed PCFICH resource of the subframe.

The PHICH carries a positive-acknowledgement (ACK)/negative-acknowledgement (NACK) signal for an uplink hybrid automatic repeat request (HARQ). The ACK/NACK signal for uplink (UL) data on a PUSCH transmitted by the wireless device is transmitted on the PHICH.

A physical broadcast channel (PBCH) is transmitted in first four OFDM symbols in a second slot of a first subframe of a radio frame. The PBCH carries system information necessary for communication between the wireless device and a BS. The system information transmitted through the PBCH is referred to as a master information block (MIB). In comparison thereto, system information transmitted on the PDCCH is referred to as a system information block (SIB).

Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group, and/or activation of a voice over Internet protocol (VoIP).

In 3GPP LTE/LTE-A, transmission of a DL transport block is performed in a pair of the PDCCH and the PDSCH. Transmission of a UL transport block is performed in a pair of the PDCCH and the PUSCH. For example, the wireless device receives the DL transport block on a PDSCH indicated by the PDCCH. The wireless device receives a DL resource assignment on the PDCCH by monitoring the PDCCH in a DL subframe. The wireless device receives the DL transport block on a PDSCH indicated by the DL resource assignment.

Figure 3:
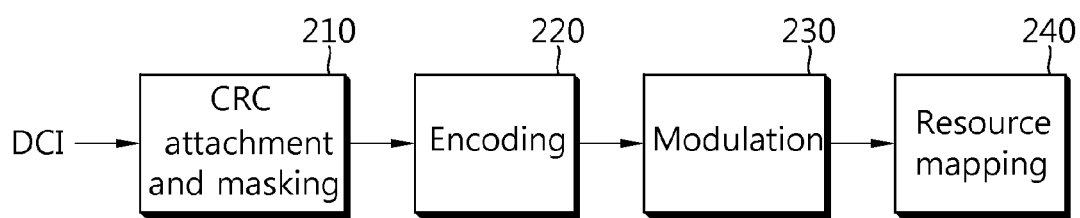
FIG. 3 is a block diagram showing a structure of a PDCCH.

FIG. 3 is a block diagram showing a structure of a PDCCH.

The 3GPP LTE/LTE-A uses blind decoding for PDCCH detection. The blind decoding is a scheme in which a desired identifier is de-masked from a cyclic redundancy check (CRC) of a received PDCCH (referred to as a candidate PDCCH) to determine whether the PDCCH is its own control channel by performing CRC error checking.

A BS determines a PDCCH format according to DCI to be transmitted to a wireless device, attaches a CRC to control information, and masks a unique identifier (referred to as a radio network temporary identifier (RNTI)) to the CRC according to an owner or usage of the PDCCH (block 210).

If the PDCCH is for a specific wireless device, a unique identifier (e.g., cell-RNTI (C-RNTI)) of the wireless device may be masked to the CRC. Alternatively, if the PDCCH is for a paging message, a paging indication identifier (e.g., paging-RNTI (P-RNTI)) may be masked to the CRC. If the PDCCH is for system information, a system information identifier (e.g., system information-RNTI (SI-RNTI)) may be masked to the CRC. To indicate a random access response that is a response for transmission of a random access preamble of the wireless device, a random access-RNTI (RA-RNTI) may be masked to the CRC. To indicate a transmit power control (TPC) command for a plurality of wireless devices, a TPC-RNTI may be masked to the CRC.

When the C-RNTI is used, the PDCCH carries control information for a specific wireless device (such information is called UE-specific control information), and when other RNTIs are used, the PDCCH carries common control information received by all or a plurality of wireless devices in a cell.

The CRC-attached DCI is encoded to generate coded data (block 220). Encoding includes channel encoding and rate matching.

The coded data is modulated to generate modulation symbols (block 230).

The modulation symbols are mapped to physical resource elements (REs) (block 240). The modulation symbols are respectively mapped to the REs.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of REs. According to an association relation of the number of CCEs and the coding rate provided by the CCEs, a PDCCH format and a possible number of bits of the PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Figure 4:
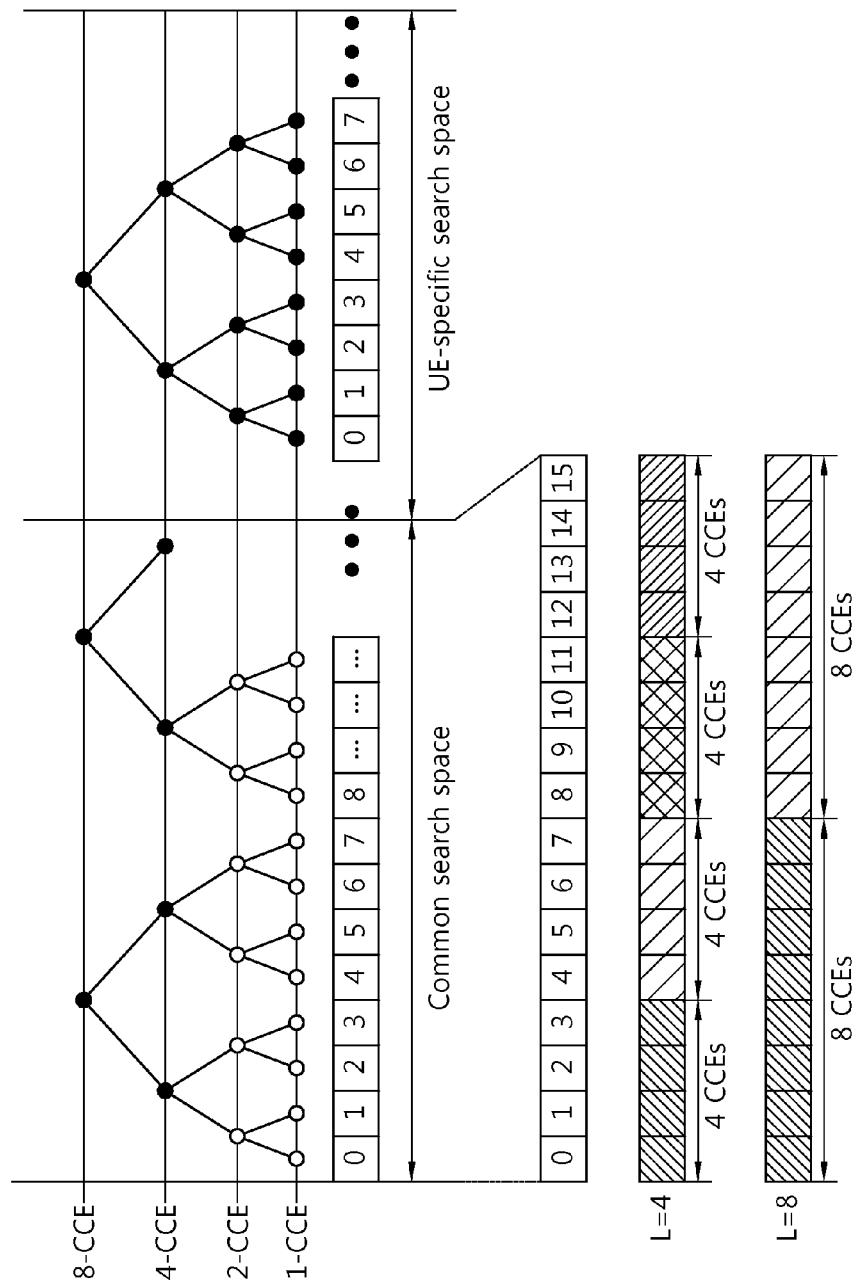
FIG. 4 shows an example of monitoring a PDCCH.

FIG. 4 shows an example of monitoring a PDCCH. The section 9 of 3GPP TS 36.213 V10.2.0 (2011-06) can be incorporated herein by reference.

The 3GPP LTE uses blind decoding for PDCCH detection. The blind decoding is a scheme in which a desired identifier is de-masked from a CRC of a received PDCCH (referred to as a candidate PDCCH) to determine whether the PDCCH is its own control channel by performing CRC error checking. A wireless device cannot know about a specific position in a control region in which its PDCCH is transmitted and about a specific CCE aggregation or DCI format used for PDCCH transmission.

A plurality of PDCCHs can be transmitted in one subframe. The wireless device monitors the plurality of PDCCHs in every subframe. Monitoring is an operation of attempting PDCCH decoding by the wireless device according to a format of the monitored PDCCH.

The 3GPP LTE uses a search space to reduce a load of blind decoding. The search space can also be called a monitoring set of a CCE for the PDCCH. The wireless device monitors the PDCCH in the search space.

The search space is classified into a common search space and a UE-specific search space. The common search space is a space for searching for a PDCCH having common control information and consists of 16 CCEs indexed with 0 to 15. The common search space supports a PDCCH having a CCE aggregation level of {4, 8}. However, a PDCCH (e.g., DCI formats 0, 1A) for carrying UE-specific information can also be transmitted in the common search space. The UE-specific search space supports a PDCCH having a CCE aggregation level of {1, 2, 4, 8}.

Table 1 shows the number of PDCCH candidates monitored by the wireless device.

TABLE 1

| Search Space Type | Aggregation level L | Size [In CCEs] | Number of PDCCH candidates | DCI formats |
|---|---|---|---|---|
| UE-specific | 1 | 6 | 6 | 0, 1, 1A, |
|  | 2 | 12 | 6 | 1B, 1D, |
|  | 4 | 8 | 2 | 2, 2A |
|  | 8 | 16 | 2 |  |
| Common | 4 | 16 | 4 | 0, 1A, 1C, |
|  | 8 | 16 | 2 | 3/3A |

A size of the search space is determined by Table 1 above, and a start point of the search space is defined differently in the common search space and the UE-specific search space. Although a start point of the common search space is fixed irrespective of a subframe, a start point of the UE-specific search space may vary in every subframe according to a UE identifier (e.g., C-RNTI), a CCE aggregation level, and/or a slot number in a radio frame. If the start point of the UE-specific search space exists in the common search space, the UE-specific search space and the common search space may overlap with each other.

In a CCE aggregation level L∈{1,2,3,4}, a search space $S^{(L)}_k$ is defined as a set of PDCCH candidates. A CCE corresponding to a PDCCH candidate m of the search space $S^{(L)}_k$ is given by Equation 1 below.

$$L \cdot \{(Y_k + m') \bmod \lfloor N_{CCE,k}/L \rfloor\} + i \quad \text{[Equation 1]}$$

Herein, i=0, 1, . . . , L−1, m=0, . . . , $M^{(L)}$−1, and $N_{CCE,k}$ denotes the total number of CCEs that can be used for PDCCH transmission in a control region of a subframe k. The control region includes a set of CCEs numbered from 0 to $N_{CCE,k-1}$. $M^{(L)}$ denotes the number of PDCCH candidates in a CCE aggregation level L of a given search space.

If a carrier indicator field (CIF) is set to the wireless device, $m'=m+M^{(L)}n_{cif}$. Herein, $n_{cif}$ is a value of the CIF. If the CIF is not set to the wireless device, m'=m.

In a common search space, $Y_k$ is set to 0 with respect to two aggregation levels L=4 and L=8.

In a UE-specific search space of the aggregation level L, a variable $Y_k$ is defined by Equation 2 below.

$$Y_k(A \cdot Y_{k-1}) \bmod D \quad \text{[Equation 2]}$$

Herein, $Y_{-1}=n_{RNTI}\neq 0$, A=39827, D=65537, k=floor($n_s/2$), and $n_s$ denotes a slot number in a radio frame.

When the wireless device monitors the PDCCH by using the C-RNTI, a search space and a DCI format used in monitoring are determined according to a transmission mode of the PDSCH. Table 2 below shows an example of PDCCH monitoring in which the C-RNTI is set.

TABLE 2

| Transmission mode | DCI format | search space | Transmission mode of PDSCH based on PDCCH |
|---|---|---|---|
| Mode 1 | DCI format 1A | common and UE specific | Single antenna port, port 0 |
|  | DCI format 1 | UE specific | Single antenna port, port 0 |
| Mode 2 | DCI format 1A | common and UE specific | Transmit diversity |
|  | DCI format 1 | UE specific | Transmit diversity |

TABLE 2-continued

| Transmission mode | DCI format | search space | Transmission mode of PDSCH based on PDCCH |
|---|---|---|---|
| Mode 3 | DCI format 1A | common and UE specific | Transmit diversity |
| | DCI format 2A | UE specific | CDD(Cyclic Delay Diversity) or Transmit diversity |
| Mode 4 | DCI format 1A | common and UE specific | Transmit diversity |
| | DCI format 2 | UE specific | Closed-loop spatial multiplexing |
| Mode 5 | DCI format 1A | common and UE specific | Transmit diversity |
| | DCI format 1D | UE specific | MU-MIMO(Multi-user Multiple Input Multiple Output) |
| Mode 6 | DCI format 1A | common and UE specific | Transmit diversity |
| | DCI format 1B | UE specific | Closed-loop spatial multiplexing |
| Mode 7 | DCI format 1A | common and UE specific | If the number of PBCH transmission ports is 1, single antenna port, port 0, otherwise Transmit diversity |
| | DCI format 1 | UE specific | Single antenna port, port 5 |
| Mode 8 | DCI format 1A | common and UE specific | If the number of PBCH transmission ports is 1, single antenna port, port 0, otherwise, Transmit diversity |
| | DCI format 2B | UE specific | Dual layer transmission (port 7 or 8), or single antenna port, port 7 or 8 |

The usage of the DCI format is classified as shown in Table 3 below.

TABLE 3

| DCI format | Contents |
|---|---|
| DCI format 0 | It is used for PUSCH scheduling. |
| DCI format 1 | It is used for scheduling of one PDSCH codeword. |
| DCI format 1A | It is used for compact scheduling and random access process of one PDSCH codeword. |
| DCI format 1B | It is used in simple scheduling of one PDSCH codeword having precoding information. |
| DCI format 1C | It is used for very compact scheduling of one PDSCH codeword. |
| DCI format 1D | It is used for simple scheduling of one PDSCH codeword having precoding and power offset information. |
| DCI format 2 | It is used for PDSCH scheduling of UEs configured to a closed-loop spatial multiplexing mode. |
| DCI format 2A | It is used for PDSCH scheduling of UEs configured to an open-loop spatial multiplexing mode. |
| DCI format 3 | It is used for transmission of a TPC command of a PUCCH and a PUSCH having a 2-bit power adjustment. |
| DCI format 3A | It is used for transmission of a TPC command of a PUCCH and a PUSCH having a 1-bit power adjustment. |

Now, scheduling for the proposed D2D communication is described.

In 3GPP LTE, communication between wireless devices is not supported, and data is transmitted/received via a BS.

Even if the D2D communication is supported, an intervention of the BS is preferably minimized to achieve unrestricted communication between the wireless devices. However, if a radio resource used in the D2D communication is a licensed band, since it is necessary to pay a license fee thereof, the use of the resource needs to be managed by the BS.

For the D2D communication, the BS sends resource allocation information to the wireless device. Information related to data transmission (e.g., modulation and coding scheme (MCS), HARQ information, transmit power, and MIMO information) may be exchanged between the wireless devices through a proper process.

Figure 5:
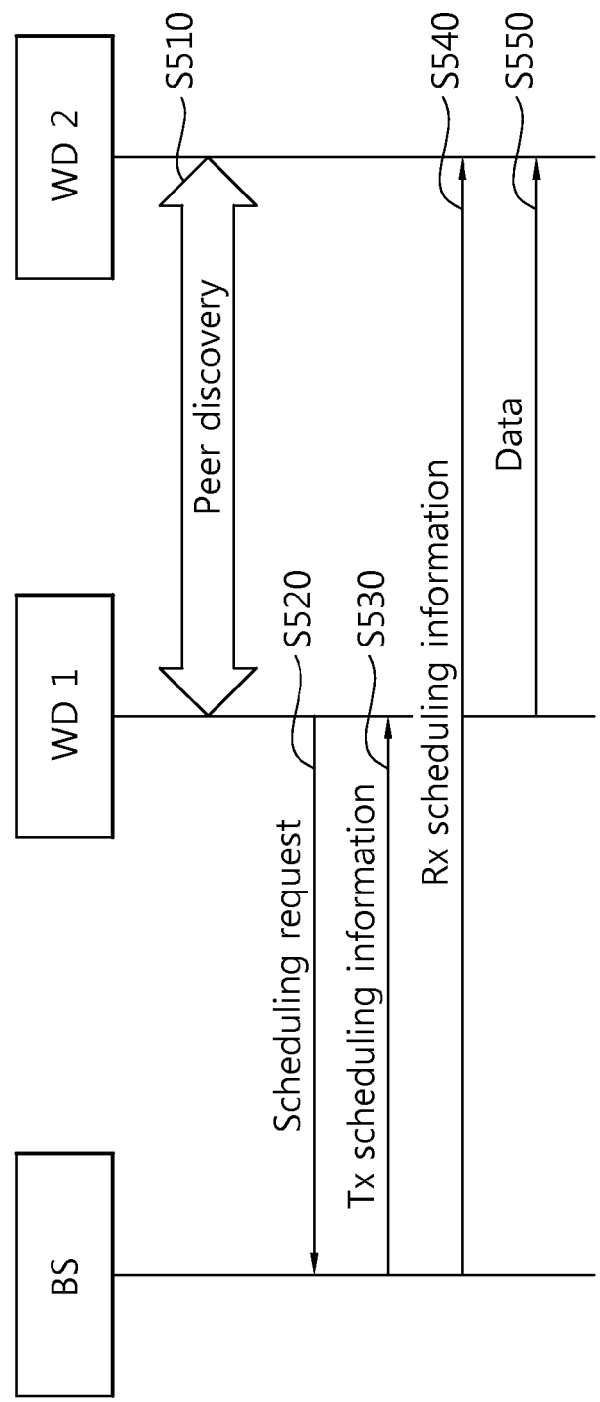
FIG. 5 is a flowchart showing D2D communication according to an embodiment of the present invention.

FIG. 5 is a flowchart showing D2D communication according to an embodiment of the present invention.

Although only two wireless devices are considered herein, this is for exemplary purposes only. The present invention may also be applied to communication between two wireless device sets. For clarity, it is described for example that a WD1 transmits data to a WD2. That is, the WD1 may be a transmitter, and the WD2 may be a receiver.

The WD1 and the WD2 are located within a distance allowing communication with each other, and perform peer discovery to identify each other (step S510).

The WD1 sends to a BS a scheduling request for transmission to the WD2 (step S520). The scheduling request may be performed by the WD1 and transmission from the WD1 to the WD2 may be performed by an order of the BS without the scheduling request.

The BS sends transmission (TX) scheduling information to the WD1 (step S530). The TX scheduling information includes information on resource allocation for transmitting a data packet from the WD1 to the WD2.

In addition, the BS sends receive (RX) scheduling information to the WD2 (step S540). The RX scheduling information includes information on resource allocation to be used when the WD2 receives a data packet from the WD1.

The WD1 transmits the data packet on the basis of the allocated TX scheduling information (step S550).

For transmission and reception of TX/RX scheduling information, the proposed embodiment proposes to transmit the TX/RX scheduling information on a PDCCH.

A new DCI format may be defined for the TX/RX scheduling information, or the existing DCI format may be reused. For example, the TX/RX scheduling information may be included in a DCI format 0 used in uplink resource allocation.

The following table shows an example of a field included in the TX/RX scheduling information.

TABLE 4

| Field | Content |
|---|---|
| Type field | It indicates whether corresponding scheduling information (or DCI format) is for D2D communication. The fields below may be valid when the type field indicates D2D communication. |
| Resource allocation field | Information regarding radio resource allocation used in transmission of a data packet. |
| Power field | Information regarding transmit power for transmission of a data packet. |
| Reference signal field | Information (e.g., a cyclic shift of a reference signal) indicating a reference signal for a corresponding data packet. |
| TX/RX field | It indicates whether corresponding scheduling information is TX scheduling information or RX scheduling information. |
| Identification field | It indicates a wireless device (e.g., WD2) for receiving a data packet if corresponding scheduling information is TX scheduling information, and indicates a wireless device (e.g., WD1) for transmitting a data packet if the corresponding scheduling information is RX scheduling information. An identifier of a corresponding wireless device (e.g., a 16-bit C-RNTI or some of the C-RNTI). |

In Table 4 above, a field name and order are for exemplary purposes only. Not all fields are necessary, and some of the fields may be omitted.

The resource allocation field may include information regarding an allocated RB. The resource allocation field may indicate a resource changed on the basis of a previously allocated uplink resource (or a most recently received uplink resource).

The resource allocation may be given on the basis of an uplink subframe. A channel for D2D communication may be configured on the basis of the same resource allocation as a PUSCH and/or a PUCCH. The WD1 may configure the PUSCH on the basis of TX scheduling information, and may transmit a data packet to the WD2 on the PUSCH.

The identification field may indicate an identifier of a corresponding wireless device. Alternatively, a BS may report, in advance, information regarding a set of wireless devices participating in the D2D communication, and the identification field may include information indicating a corresponding wireless device included in the wireless device set. For example, the BS reports, in advance, information regarding 6 wireless devices participating in the D2D communication through an RRC message to the wireless device. In addition, the identification field may include a 6-bit bitmap indicating the 6 wireless devices.

The TX/RX scheduling information may be transmitted on a PDCCH (or an enhanced PDCCH (EPDCCH)). D2D-RNTI may be used for PDCCH monitoring for the TX/RX scheduling information. The wireless device may attempt decoding of a PDCCH candidate by using the D2D-RNTI, and if the decoding is successful, may acquire the TX/RX scheduling information.

A search space for the TX/RX scheduling information for the D2D communication (this is called a D2D search space) may be defined. The D2D search space may include a common search space or a UE-specific search space.

A location of the D2D search space may be fixed. For example, $Y_k$ of Equation 1 may be given as a specific value.

The location of the D2D search space may be variable. For example, $Y_k$ of Equation 1 may be give as follows.

$$Y_k = (A' \cdot Y'_{k-1}) \bmod D' \qquad \text{[Equation 3]}$$

Herein, A' and D' are parameters, and $Y'_{-1}$ is a value given from a higher layer or derived from D2D-RNTI.

A subframe for searching for the TX/RX scheduling information for the D2D communication (this is called a D2D search subframe) may be designated. One or more subframes in a radio frame may be configured as a D2D search frame. Configuration information for the D2D search frame may be reported by the BS to the wireless device. The configuration information may be specific to the wireless device, or may be common to all wireless devices. The wireless device may recognize a DCI format 0 received in the D2D search subframe as the TX/RX scheduling information for the D2D communication.

The TX/RX scheduling information for the D2D communication may be distinguished according to an HARQ process. For example, assume that the wireless device supports 8 HARQ processes, and HARQ process IDs are 0 to 7. The HARQ process IDs 0 to 5 may be used for communication with the existing BS, and the HARQ process IDs 6 and 7 may be used for D2D communication.

The HARQ process ID may be included in the TX/RX scheduling information, or may be determined depending on a subframe in which the TX/RX scheduling information is received.

Now, an example of configuring the TX/RX scheduling information is described by taking a DCI format 0 of 3GPP LTE for example. Referring to the section 5.3.3.1.1 of 3GPP TS 36.212 V10.2.0 (2011-06), a field constituting the DCI format 0 is as follows.

TABLE 5

Carrier indicator: 0 or 3 bits.
Flag for format0/format1A differentiation: 1 bit
FH(Frequency hopping) flag: 1 bit
Resource block assignment and hopping resource allocation
MCS(Modulation and coding scheme) and RV(redundancy version): 5 bits
NDI(New data indicator): 1 bit
TPC: 2 bits
Cyclic shift for DM RS and OCC index: 3 bits
UL index: 2 bits
DAI(Downlink Assignment Index): 2 bits
CSI request: 1 or 2 bits
SRS request: 0 or 1 bit
Resource allocation type: 1 bit By using a field for distinguishing the DCI formats 0 and 1A, it may indicate that a corresponding DCI format is TX/RX scheduling information for D2D. Alternatively, it may be allowed to indicate whether this field is the existing DCI format 0 or the TX/RX scheduling information. An FH field, a CSI request field, an NDI field, or a combination of them may also be used for this usage.

The resource allocation may reuse a resource allocation of the DCI format 0.

The TX/RX field and the identification field may reuse some of the fields of the DCI format 0. For example, the FH field, CSI request field, and NDI field of the DCI format 0 or the combination of them may indicate the TX/RX field and the identification field.

Whether a corresponding DCI is the existing DCI format 0 or the TX/RX scheduling information for the D2D may be reported by the BS to the wireless device through a higher layer message such as an RRC message.

Although the DCI format 0 is described for example in the above embodiment, a DCI format 4 may also be used in D2D MIMO scheduling. The DCI format 4 is used for scheduling of 2 codewords. However, in D2D, it may be used for scheduling of a single codeword, and the remaining fields may be reused as a field for the D2D as shown in Table 4.

Figure 6:
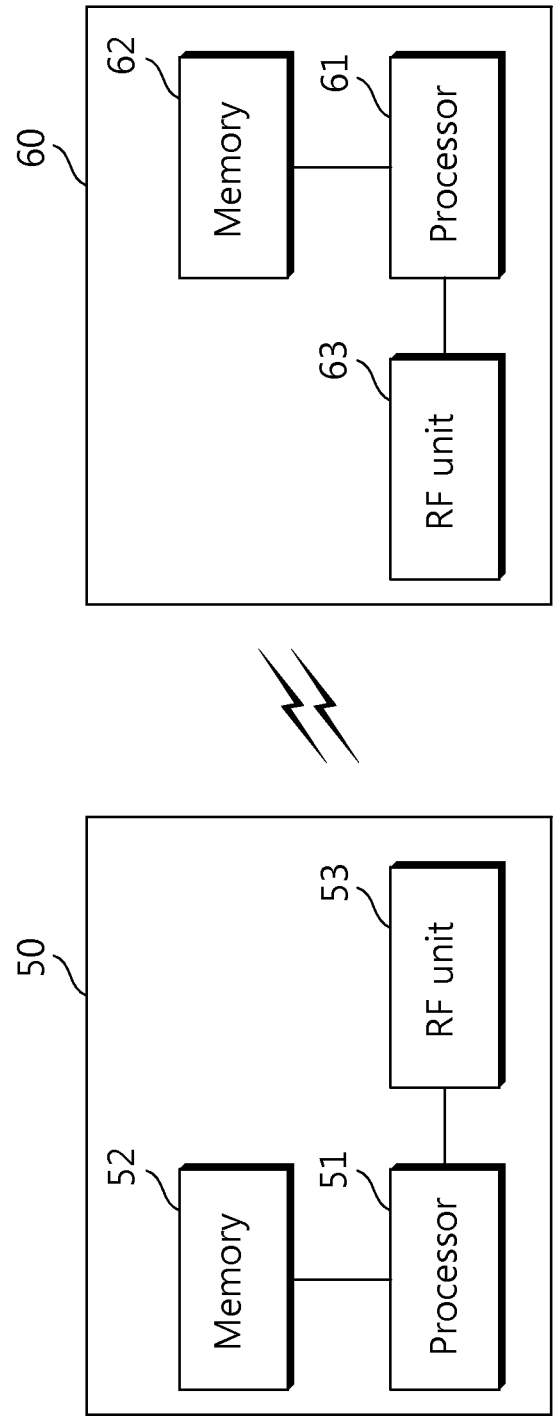
FIG. 6 is a block diagram showing a wireless communication system to implement embodiments of the present invention.

FIG. 6 is a block diagram showing a wireless communication system to implement embodiments of the present invention.

A BS 50 includes a processor 51, a memory 52, and a radio frequency (RF) unit 53. The memory 52 is coupled to the processor 51, and stores a variety of information for driving the processor 51. The RF unit 53 is coupled to the processor 51, and transmits and/or receives a radio signal. The processor 51 implements the proposed functions, procedures, and/or methods. In the aforementioned embodiment, an operation of the BS may be implemented by the processor 51. The processor 51 may transmit TX/RX scheduling information through a PDCCH/EPDCCH.

A wireless device 60 includes a processor 61, a memory 62, and an RF unit 63. The memory 62 is coupled to the processor 61, and stores a variety of instructions to implement functions of the processor 61. The RF unit 63 is coupled to the processor 61, and transmits and/or receives a radio signal. The processor 61 implements the proposed functions, procedures, and/or methods. In the aforementioned embodiment, an operation of the wireless device may be implemented by the processor 61. The processor 61 may monitor TX scheduling information or RX scheduling information, and may support D2D communication.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of transmitting a data packet in a wireless communication system, the method comprising:
   performing, by a transmitter, a peer discovery with a receiver;
   monitoring, by the transmitter, whether scheduling information is received from a base station;
   wherein a physical downlink control channel (PDCCH) candidate is decoded in a search space of a subframe; and when the decoding is successful, the scheduling information is received in a corresponding PDCCH; and
   transmitting, by the transmitter, the data packet to the receiver based on the scheduling information,
   wherein the scheduling information is configured within a downlink control information (DCI) format 0, which is used for a scheduling of a physical uplink shared channel (PUSCH) in an uplink cell, and
   wherein the DCI format 0 includes:
      a resource allocation field for indicating a resource allocation used in a transmission or reception of the data packet,
      a transmission/reception field for indicating whether the scheduling information is for a transmission scheduling or a reception scheduling, and
      an identification field for indicating an identifier of the receiver receiving the data packet when the scheduling information is the transmission scheduling, or an identifier of the transmitter transmitting the data packet when the scheduling information is the reception scheduling.

2. The method of claim 1, wherein the PDCCH candidate is decoded based on an identifier for device-to-device (D2D) communication.

3. The method of claim 2, wherein the search space is defined based on the identifier for the D2D communication.

4. The method of claim 1, wherein the subframe is selected to monitor the scheduling information among a plurality of subframes.

5. The method of claim 1, further comprising:
   transmitting, by the transmitter, a request of the scheduling information to the base station.

6. A wireless device for transmitting a data packet in a wireless communication system, the wireless device comprising:
   a transceiver configured to transmit and receive a radio signal; and
   a processor operatively coupled to the transceiver and configured to:
   perform a peer discovery with a receiver via the transceiver;
   monitor whether scheduling information is received from a base station;
   wherein a physical downlink control channel (PDCCH) candidate is decoded in a search space of a subframe; and when the decoding is successful, the scheduling information is received in a corresponding PDCCH; and
   transmit the data packet to the receiver based on the scheduling information via the transceiver,
   wherein the scheduling information is configured within a downlink control information (DCI) format 0, which is used for a scheduling of a physical uplink shared channel (PUSCH) in an uplink cell, and
   wherein the DCI format 0 includes:
      a resource allocation field for indicating a resource allocation used in a transmission or reception of the data packet,
      a transmission/reception field for indicating whether the scheduling information is for a transmission scheduling or a reception scheduling, and
      an identification field for indicating an identifier of the receiver receiving the data packet when the scheduling information is the transmission scheduling, or an identifier of the transmitter transmitting the data packet when the scheduling information is the reception scheduling.

7. The wireless device of claim 6, wherein the PDCCH candidate is decoded based on an identifier for device-to-device (D2D) communication.

8. The wireless device of claim 7, wherein the search space is defined based on the identifier for the D2D communication.

9. The wireless device of claim 6, wherein the subframe is selected to monitor the scheduling information among a plurality of subframes.

* * * * *